(12) United States Patent
Greer

(10) Patent No.: US 6,194,675 B1
(45) Date of Patent: Feb. 27, 2001

(54) BOXER LINKAGE FOR DOUBLE THROW SAFETY SWITCHES

(75) Inventor: David E. Greer, Lexington, KY (US)

(73) Assignee: Square D Company, Palatine, IL (US)

( * ) Notice: Subject to any disclaimer, the term of this patent is extended or adjusted under 35 U.S.C. 154(b) by 0 days.

(21) Appl. No.: 09/475,399

(22) Filed: Dec. 30, 1999

(51) Int. Cl.$^7$ .................................................. H01H 9/26

(52) U.S. Cl. ........................ 200/50.32; 200/17 R; 200/18

(58) Field of Search .................................. 200/1 R, 16 R, 200/6 R, 17 R, 18, 50.01, 50.32, 50.33–50.37, 50.4, 329, 332, 335, 337

(56) References Cited

U.S. PATENT DOCUMENTS

| | | | |
|---|---|---|---|
| 31,634 | 7/1984 | Norby | 200/72 |
| 3,593,235 | 7/1971 | Nicol | 335/186 |
| 3,604,300 | 9/1971 | Allison | 83/76 |
| 3,614,362 | 10/1971 | Keranen | 200/167 |
| 3,632,936 | 1/1972 | Piber | 200/157 |
| 3,636,286 | 1/1972 | Hults | 200/68 |
| 3,644,793 | 2/1972 | Ilk | 317/141 |
| 3,646,355 | 2/1972 | Ireland et al | 307/64 |
| 3,680,016 | 7/1972 | Becker et al. | 335/106 |
| 3,711,669 | 1/1973 | Keranen | 200/167 |
| 3,720,797 | 3/1973 | Gunn et al. | 200/614.08 |
| 3,724,402 | 6/1973 | Nicol et al. | 335/13 |
| 3,726,494 | 4/1973 | Flagg et al. | 244/3.14 |
| 3,740,741 | 6/1973 | Jones | 340/272 |
| 3,742,403 | 6/1973 | Nicol | 335/13 |
| 3,805,115 | 4/1974 | Heckelman | 317/80 |
| 3,838,355 | 9/1974 | Papaieck | 331/39 |
| 3,881,077 | 4/1975 | Piber | 200/61.69 |
| 3,891,862 | 6/1975 | Clark | 307/125 |
| 3,895,198 | 7/1975 | Piber | 200/61.62 |
| 3,967,132 | 6/1976 | Takamine | 290/4 |
| 4,001,683 | 1/1977 | McNeilly | 324/115 |
| 4,002,874 | 1/1977 | Brown | 200/321 |
| 4,110,585 | 8/1978 | Brown | 200/305 |
| 4,121,065 | 10/1978 | Woodard | 200/42 |

(List continued on next page.)

OTHER PUBLICATIONS

Eaton Catalog, Oct. 1998, Cutler–Hammer –G–14 Safety Switches Heavy Duty Double Throw, Fusible, Non–Fusible; Discount Symbol 22CD; Cat. 73.01.T.E..

* cited by examiner

Primary Examiner—Michael Friedhofer
(74) Attorney, Agent, or Firm—David R. Stacey; Larry I. Golden; Larry T. Shrout

(57) ABSTRACT

A linkage assembly for a double throw safety switch including a frame connected to a first slider plate and a second slider plate. The first and second slider plates are moveably connected to the frame by guides in the form of slots which cooperate with slider supports on the frame. The profile of the slots define a range of movement of the slider plates. A driver arm is used to effect simultaneous movement of the slider plates either toward or away from a central portion of the driver arm. A first follower arm which controls a first single throw switch, and a second follower arm which controls a second single throw switch, are also connected to the frame by a spline coupling. The first follower arm includes a slider support which cooperates with a guide, again a slot, in the first slider plate. Similarly, the second follower arm includes a slider support which cooperates with a guide in the second slider plate. Movement of the driver arm effects movement of the slider plates, which in turn, control the follower arms. The guides for controlling the follower arms are configured to either maintain the position of the follower arm, or to move the follower arm to turn the switch "on" or "off." Movement of the follower arms is preferably rotational. In a modified embodiment, a single slider plate is utilized to control both the first and the second follower arms. In both cases, the linkage assembly can be used to prevent both switches from being "on" at the same time.

20 Claims, 13 Drawing Sheets

U.S. PATENT DOCUMENTS

| | | | |
|---|---|---|---|
| 4,121,069 | 10/1978 | Long | 200/67 |
| 4,154,997 | 5/1979 | Grebner et al. | 200/159 |
| 4,166,935 | 9/1979 | Norby | 200/139 |
| 4,177,389 | 12/1979 | Schott | 307/64 |
| 4,218,602 | 8/1980 | Creech | 200/302 |
| 4,267,711 | 5/1981 | Kolxe | 68/12 |
| 4,335,287 | 6/1982 | Aschenbach et al. | 200/302 |
| 4,337,450 | 6/1982 | Matthies | 337/66 |
| 4,370,528 | 1/1983 | Aschenbach | 200/6 |
| 4,454,398 | 6/1984 | Aschenbach et al. | 200/302.3 |
| 4,490,694 | 12/1984 | Godbout | 333/104 |
| 4,517,717 | 5/1985 | Gentry | 29/6 |
| 4,525,697 | 6/1985 | Jones et al. | 337/354 |
| 4,544,810 | 10/1985 | Butterworth | 200/5 |
| 4,559,971 | 12/1985 | Bradshaw | 137/596.17 |
| 4,736,081 | 4/1988 | Sorrells | 200/160 |
| 4,760,278 * | 7/1988 | Thomson | 307/64 |
| 4,788,618 | 11/1988 | Kimua | 361/86 |
| 4,791,255 | 12/1988 | Eliexer | 200/144 |
| 4,866,221 | 9/1989 | Obermann et al. | 200/5 |
| 4,908,553 | 3/1990 | Hoppie et al. | 318/382 |
| 4,934,492 | 6/1990 | Hayes-Sheen | 188/353 |
| 4,999,598 * | 3/1991 | Jannesari et al. | 335/122 |
| 5,005,382 | 4/1991 | Duve | 68/12.16 |
| 5,045,648 | 9/1991 | Fogelman, Sr. | 200/43.16 |
| 5,052,424 | 10/1991 | Zerndt et al. | 137/1 |
| 5,117,189 | 5/1992 | Terminello et al. | 324/415 |
| 5,149,998 | 9/1992 | Wolcott | 310/105 |
| 5,157,383 | 10/1992 | Fisher | 340/574 |
| 5,216,396 | 6/1993 | Stahly | 335/80 |
| 5,262,679 | 11/1993 | Schweitzer, III et al. | 307/127 |
| 5,308,957 | 5/1994 | Huffington | 219/483 |
| 5,355,024 | 10/1994 | Elliott et al. | 307/73 |
| 5,397,868 * | 3/1995 | Smith et al. | 200/18 |
| 5,436,978 | 7/1995 | Smith et al. | 200/50 |
| 5,486,978 | 1/1996 | Fishovitz | 361/617 |
| 5,542,513 | 8/1996 | Reyes | 192/9 |
| 5,612,580 | 3/1997 | Janosis et al. | 307/64 |
| 5,642,002 | 6/1997 | Menkanik et al. | 307/64 |
| 5,725,085 * | 3/1998 | Seymour et al. | 200/50.33 |
| 5,934,455 * | 8/1999 | Vuorinen | 200/430 |
| 6,043,439 * | 3/2000 | Crooks et al. | 200/50.33 |

BOXER LINKAGE FOR DOUBLE THROW SAFETY SWITCHES

DESCRIPTION

1. Technical Field

The present invention is generally directed to linkages for controlling switches and more particularly to a linkage assembly for use as a double throw safety switch for controlling a first switch and a second switch so that both switches cannot be "on" at the same time.

2. Background of the Invention

There are many instances when more than one switch is used in connection with operation of a machine or system. However, in such situations, it is not always desirable to allow two switches to be "on" at the same time. The present invention provides a mechanical linkage to control two conventional single throw switches to create a double throw safety switch. The linkage ensures that both switches cannot both be in an "on" position at the same time. Instead, either both switches are "off," or only one of the two switches is "on" and the other is "off." Prior linkages were difficult to manufacture and to repair. The present linkage can be assembled top-down with a minimum of fasteners. Additionally, the single throw switches are not required to be rigidly mounted to the linkage and can be removed independent of the linkage assembly.

SUMMARY OF THE INVENTION

The present invention is directed to a linkage assembly for a double throw safety switch. In one embodiment, the linkage assembly includes a main frame having a first slider plate moveably fastened to the frame and a second slider plate also moveably fastened to the frame. A driver arm, also connected to the frame, is connected the first slider plate and to the second slider plate to effect movement of both plates. A first follower arm is connected to the frame and to the first slider plate, and a second follower arm is connected to the frame and to the second slider plate. The first and second follower arms control a first and second single throw switch, respectively, and can be connected to ensure that both switches are not "on" at the same time.

The first slider plate includes a first guide defined to allow for movement of the first slider plate, preferably linear, upon movement of the driver arm. Similarly, the second slider plate also includes a first guide defined to allow for movement, again preferably linear, of the second slider plate. The first slider plate also includes a second guide defined to either maintain the position of the first follower arm, or to move the first follower arm, preferably by rotating the first follower arm, upon linear movement of the first slider plate away from a central portion of the driver arm. The second slider plate also includes a second guide defined to either maintain the position of the second follower arm, or to move the second follower arm, preferably by rotating the second follower arm, upon linear movement of the second slider plate away from the central portion of the driver arm.

The first guides in the first and second slider plates can be in the form of slots which cooperate with slider supports on the frame which extend through the slots. The profile of each slot defines a range of movement of the respective slider plate. Similarly, the guides in each slider plate for the follower arms can be profiled to effect a particular range of movement of the follower arm upon movement of the slider plate.

The first and second follower arms can be connected, preferably by a shaft in the follower arm, to a first and a second switch, respectively. Movement of the first follower arm is utilized to control the first switch and movement of the second follower arm is utilized to control the second switch.

In operation, rotation of the driver arm effects linear movement of the first slider plate and the second slider plate. The linear movement of the first slider plate either maintains the position of the first follower arm or effects rotational movement of the first follower arm depending on the direction of the driver arm and the position of the follower arm prior to movement of the driver arm. Similarly, linear movement of the second slider plate either maintains the position of the second follower arm or effects rotational movement of the second follower arm. The first and second slider plates, and the first and second follower arms are configured such that the first switch is not "on" when the second switch is "on."

The linkage assembly can further comprise a cover connected to the frame and an engaging mechanism which engages the cover when either the first switch or the second switch is "on," to prevent removal of the cover. In addition the linkage assembly may include an override mechanism which disengages the engaging mechanism when either the first switch or the second switch is "on" to allow removal of said cover. The override mechanism may comprise a defeat slider connected to frame. A defeat arm and a defeat shaft can be utilized to move the defeat slider to disengage the engaging mechanism.

In an alternative embodiment, the linkage assembly can utilize a single slider plate to control the movement of both the first and the second follower arms. The single slider plate would include first guides, preferably one or more slots, to control movement of the slider plate with respect to the frame, and a second guide to control movement of the first follower arm, and a third guide to control movement of the second follower arm. The profile of the second and third guides can be defined to either maintain the position of the follower arm, or to move the follower arm to either an "on" or "off" position depending on the direction of movement of the slider plate. A driver arm can be pivotally mounted to control movement of the slider plate.

Further aspects of the invention are described in the detailed description of the preferred embodiment and the claims, and are shown in the drawings.

DETAILED DESCRIPTION OF THE PREFERRED EMBODIMENTS

Figure 1:
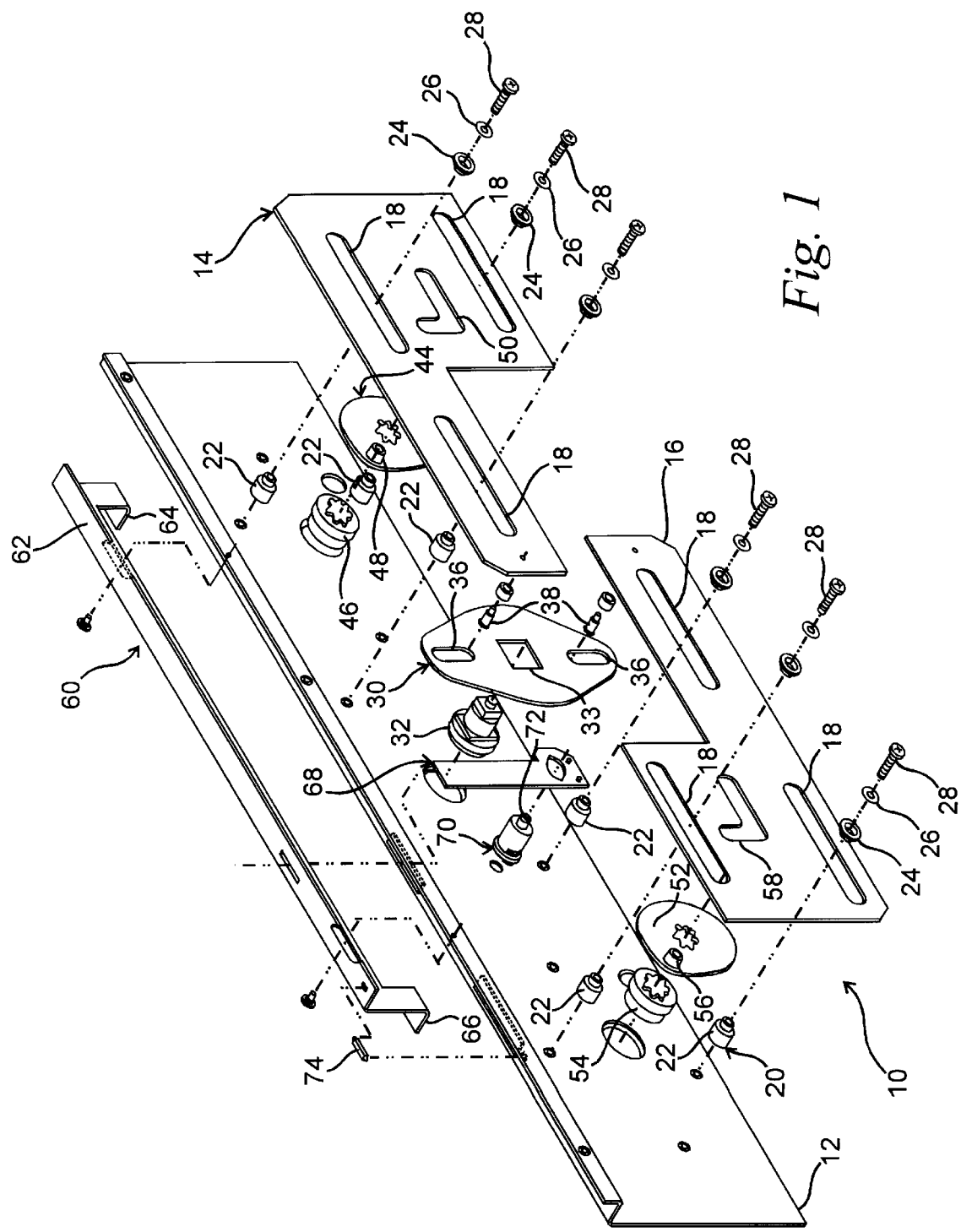
FIG. 1 is a perspective exploded view of one embodiment of the linkage assembly of the present invention.

While this invention is susceptible of embodiments in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

Figure 5:
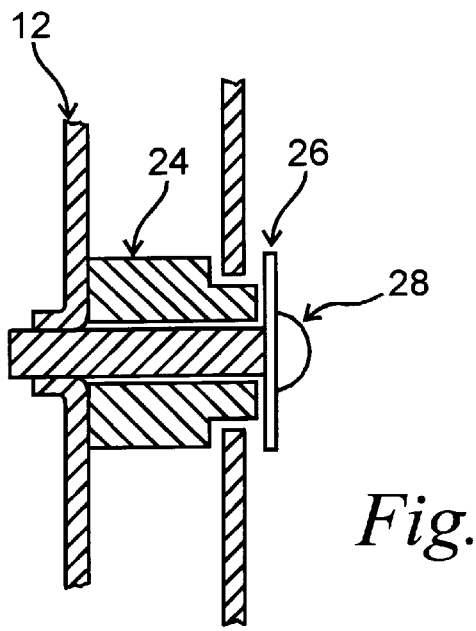
FIG. 5 is a cross-sectional view of a slider support for use with the linkage assembly of the present invention.
Figure 8:
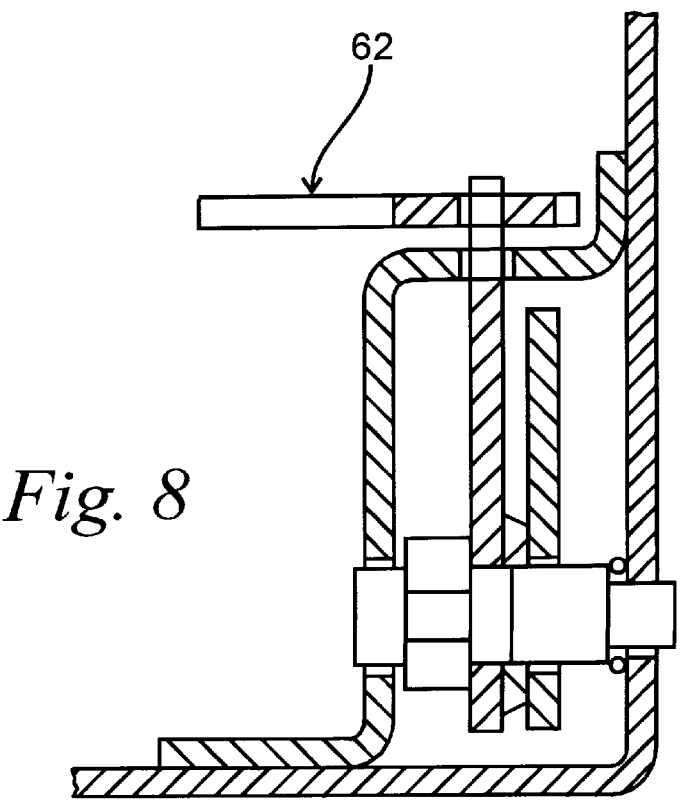
FIG. 8 is a cross-sectional view of a portion of the override mechanism of FIG. 7.

The components of a linkage assembly 10 of a double throw safety switch of the present invention are shown in FIG. 1. The linkage assembly 10 includes a frame 12 which supports the remaining components. The assembly further includes a first (or "top," depending on the orientation of the double throw safety switch) slider plate 14 and a second (or bottom) slider plate 16 which are moveably fastened to the frame 12 to allow for linear movement of the slider plates 14, 16. Specifically, the slider plates 14, 16 are provided with one or more guides which cooperate with structure on the frame to effect movement of the slider plates toward or away from a central portion of the frame. Preferably the guides are in the form of slots 18 in the slider plates. Slider supports 20 connected to the frame 12 fit into the slots of the slider plates 14, 16 and allow for slidable movement of the slider plates 14, 16 the length of the slots 18. The profile of the slots 18 defines the allowable range of movement. The slider supports 20 mounted to the frame preferably include a bushing 22, a slider roller 24 which fits into the slot 18, a washer 26 and a screw 28. The slider supports fasten the slider plates to the frame. A cross-sectional view of the slider support is shown in FIG. 5.

A driver arm 30 is connected to the frame 12 by a handle shaft 32 which fits into an opening 33 in the driver arm 30. The handle shaft 32 is attached to a control arm 34 or crank (see FIGS. 9A–D) which controls rotational movement of the handle shaft 32 and, in turn, the driver arm 30. In the embodiment shown in FIG. 1, the driver arm 30 is provided with slots 36 which cooperate with slider supports 38 mounted to the first and second slider plates 14, 16, respectively. Alternatively, slider supports 40 can be mounted to the driver arm, and slots 42 can be provided on the slider plates 14, 16, as shown in FIGS. 2–4.

The linkage assembly 10 further includes a first follower arm 44 connected by a spline coupling 46 to the frame 12. The spline coupling 46 allows for rotational movement of the follower arm 44. The first follower arm 44 includes a slider support 48, this time in the form of a rivet, which cooperates with a guide 50, in the form of a L-shaped slot, on the first slider plate 14, such that movement of the slider plate 14 will cause the first follower arm 44 to maintain its position, or rotate either clockwise or counterclockwise. Similarly, a second follower arm 52 is also connected by a spline coupling 54 to the frame 12. The second follower arm 52 includes a slider support in the form of a rivet 56 which cooperates with a guide in the form of an L-shaped slot 58 in the second slider plate 16. Again, similar to the first follower arm 48, movement of the second slider plate 16 causes the second follower arm 52 to either maintain its position, or to rotate either clockwise or counterclockwise. Rotation of the follower arms 44, 52 cause the spline couplings 46, 54 to rotate and can be used to control a first single throw switch and a second single throw switch (see FIGS. 9A–D) respectively. Specifically, the spline couplings mate with the mechanism shafts of the single throw switches. Therefore, the single throw switch mechanisms are not required to be mounted directly to the linkage assembly 10, and can be independently removed.

Figure 2:
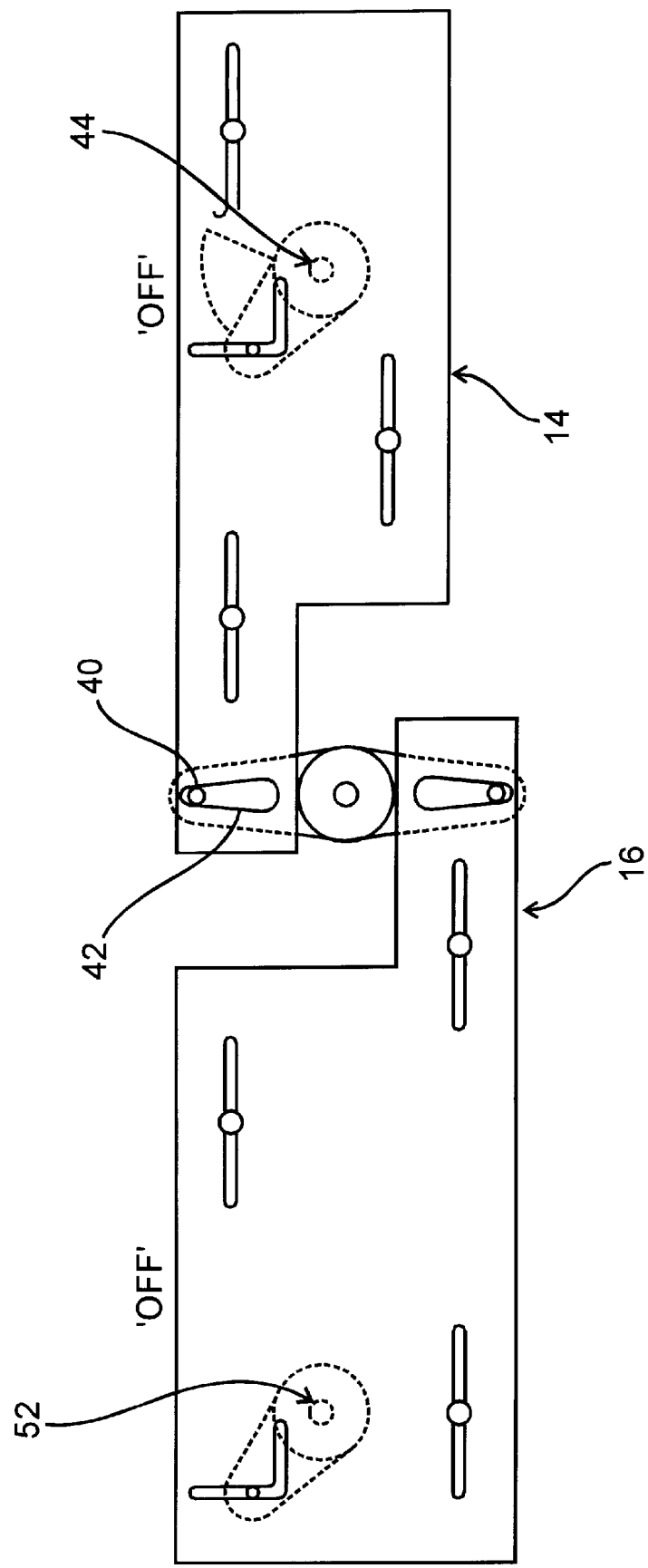
FIG. 2 is a modified embodiment of a partial linkage assembly of the present invention positioned to have both switches in an "off" position.
Figure 3:
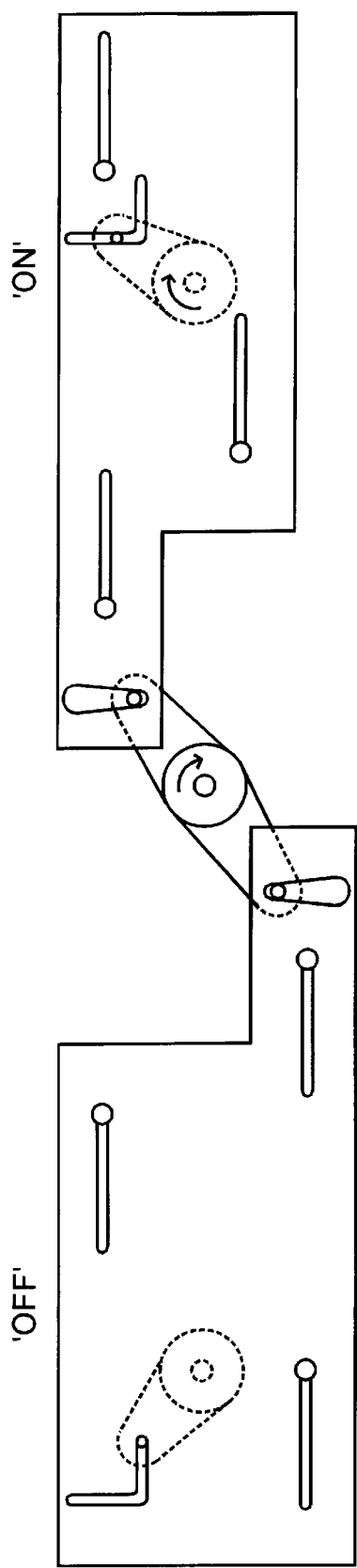
FIG. 3 is the partial linkage assembly of FIG. 2 positioned to have the right switch "on" and the left switch "off"

Referring to FIG. 2, the linkage assembly is shown positioned so that both switches (not shown) controlled by the first and second follower arms 44, 52 of the assembly, are in the "off" position. Clockwise rotation of the driver arm 30 (effected by movement of the control arm 34) as shown in FIG. 3, forces the first slider plate 14 to move or slide outward away from the shaft 32, or a central portion of the driver arm 30 (i.e., to the right in the FIGURE), and forces the second slider plate 16 to move in the opposite direction from the direction of the first slider plate 14 (i.e., to the left in the FIGURE). This movement is controlled by the slots 18 in the first and second slider plates 14, 16. Movement of the first slider plate 14 away from the shaft 32, forces the slider support 48 on the first follower arm 44 to move the first follower arm 44 clockwise, turning "on" the switch controlled by the first driver arm 44. Simultaneously, the slider support 56 of the second follower arm 52 follows the lower portion of the L-shaped slot 38 in the second slider plate 16 (as the second slider plate 16 moves away from the shaft 32 in the direction opposite the first slider plate 14) to keep the second switch in the "off" position.

Figure 4:
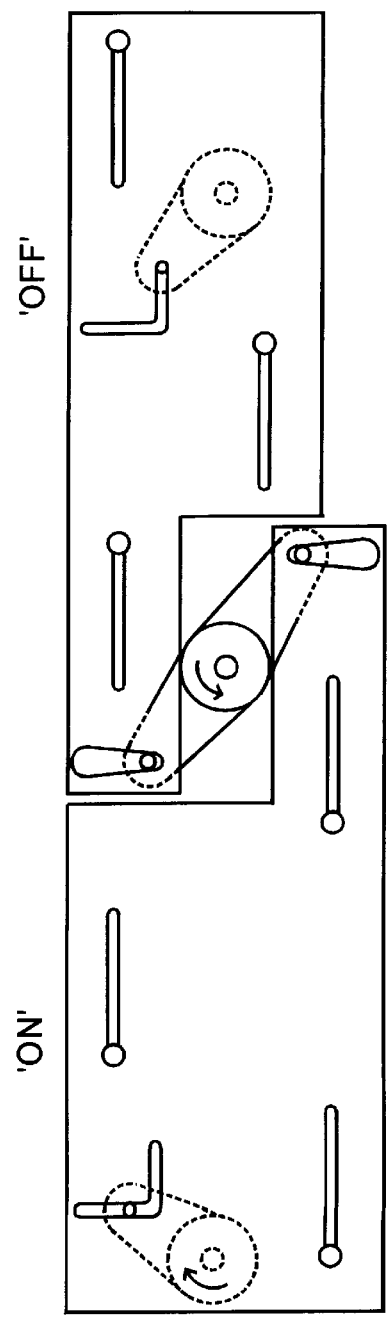
FIG. 4 is the partial linkage assembly of FIG. 2 positioned to have the right switch "off" and the left switch "on"

Starting again from the configuration of FIG. 2, counterclockwise movement of the driver arm 30 forces the first slider plate 14 and the second slider plate 16 to move inward toward the shaft 32, and toward each other, as shown in FIG. 4. Movement of the first slider plate 14 inward (to the left) allows the slider support 48 of the first follower arm 44 to move along the lower portion of the L-shaped slot 50 of the first slider plate 14, and keep the first switch in the "off" position. Movement of the second slider plate 16 inward (to the right) causes the slider support 56 of the second follower arm 52 to move clockwise, which turns the second switch to an "on" position. In this manner, the first switch and the second switch cannot be "on" at the same time.

In other words, because each of the first and the second follower arms 14, 16 is attached to a single throw switch interior mechanism, as the slider plates slide, they cause one or the other follower arms to be rotated, thus activating the corresponding switch. The two switches can be electrically tied together in such a manner that together they behave as a double throw switch.

Figure 6:
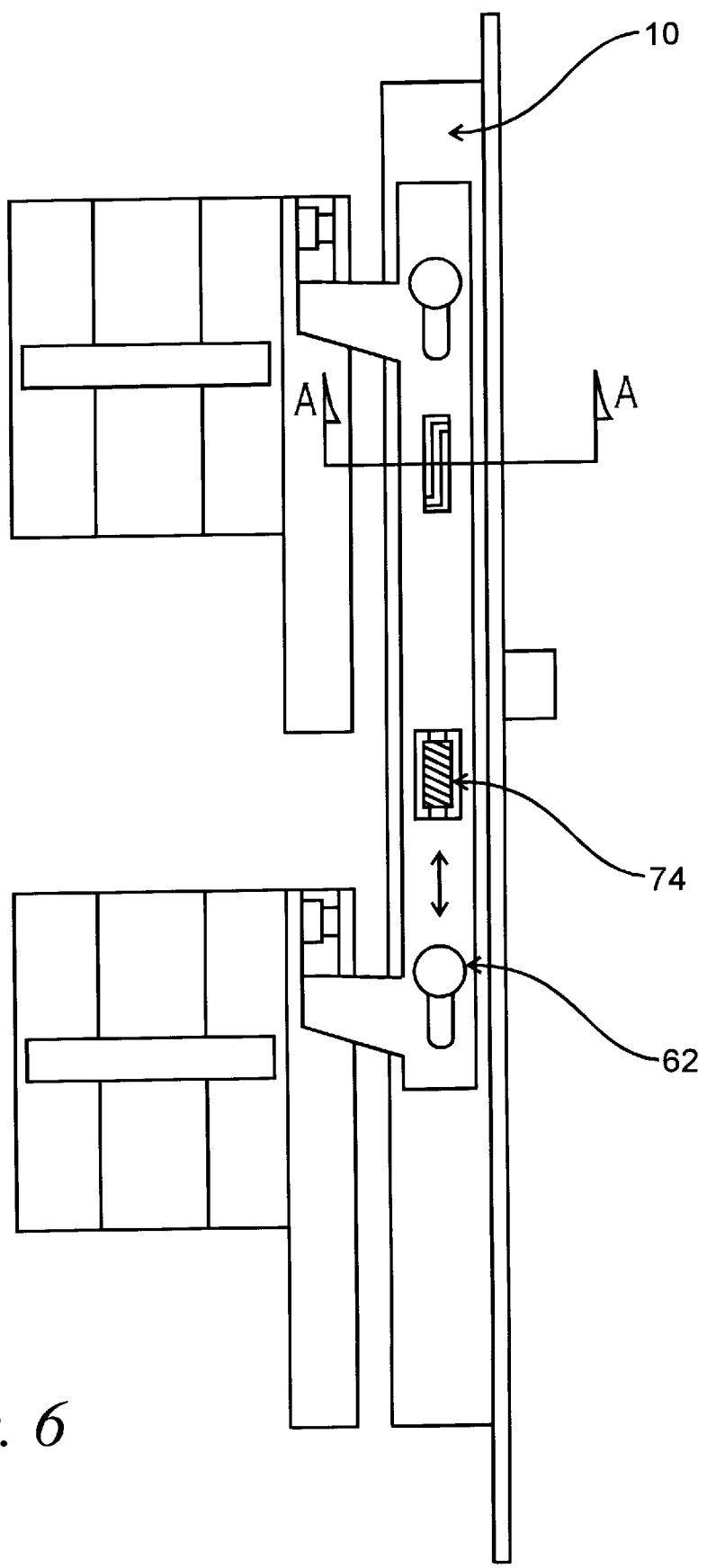
FIG. 6 is a side plan view of an override mechanism for use with the linkage assembly of the present invention.
Figure 7:
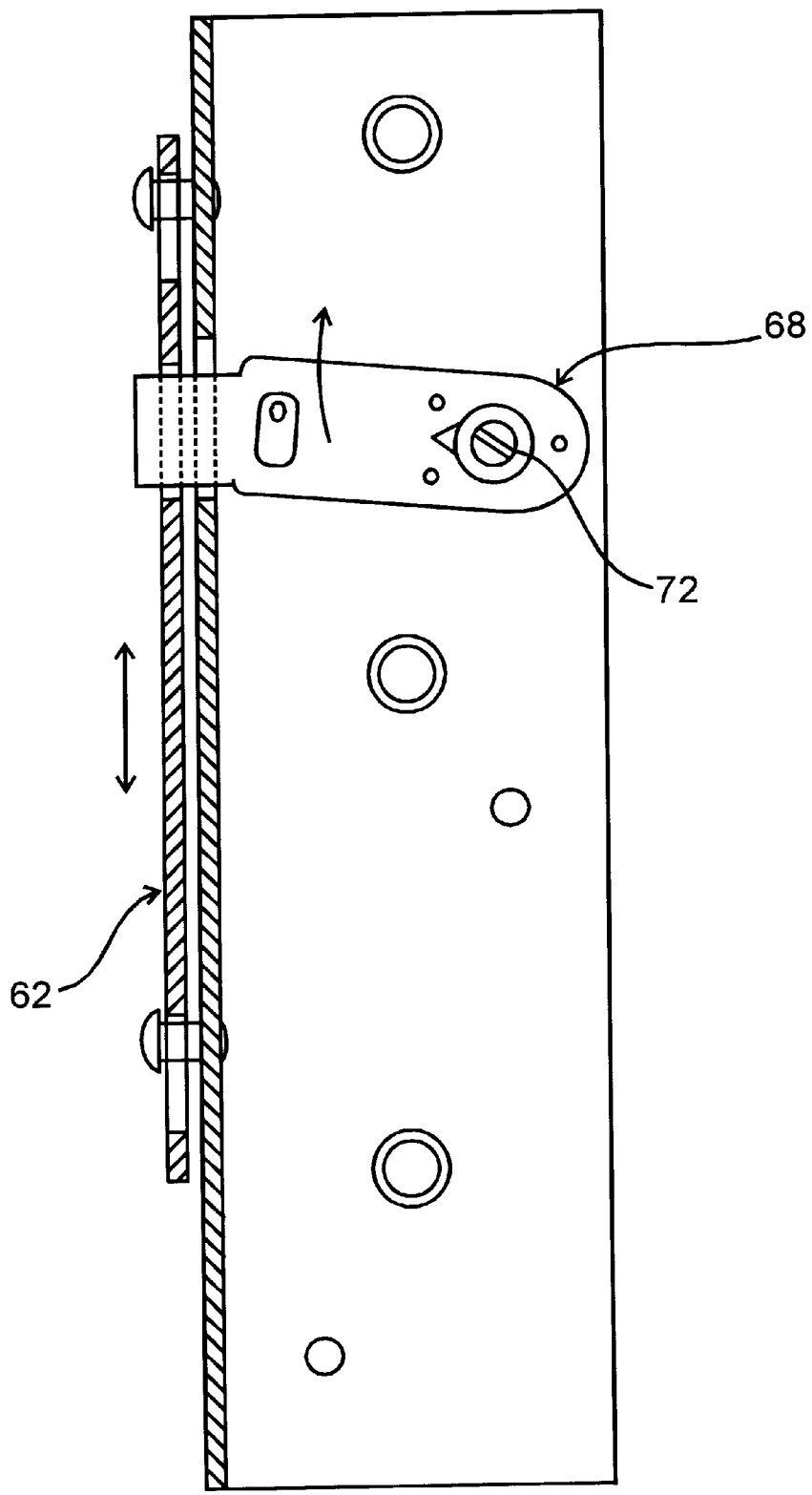
FIG. 7 is a front view of an override mechanism for use with the linkage assembly of the present invention.

In normal operation, the cover of the double throw safety switch cannot be opened when one of the two switches is "on." This is because a conventional engaging mechanism (e.g., a hook) cooperates with structure in the cover (e.g., a slot or ring) to keep someone from inadvertently removing the cover when a switch is "on." However, in certain situations when it is necessary, the linkage assembly 10 is provided with an override, or defeat, mechanism 60 which can be utilized to disengage the cover when one of the switches is "on." The override mechanism 60 includes a slider 62 (sometimes referred to as a defeat slider or slider bar) having a first leg 64 and a second leg 66, a defeat arm 68 and a defeat shaft 70. The defeat shaft 72 includes a groove 72, which is sized to mate with a conventional screwdriver, which protrudes through an opening on the cover. Rotational movement of the shaft (with a screw driver) causes the defeat arm to move clockwise (See FIGS. 6 and 7) which in turn moves the defeat slider 62. The legs 64, 66 of the defeat slider 62 contact the engaging mechanism and disengage the engaging mechanism allowing for removal of the cover. A spring 74 forces the defeat slider to return to its normal position.

Figure 9A:
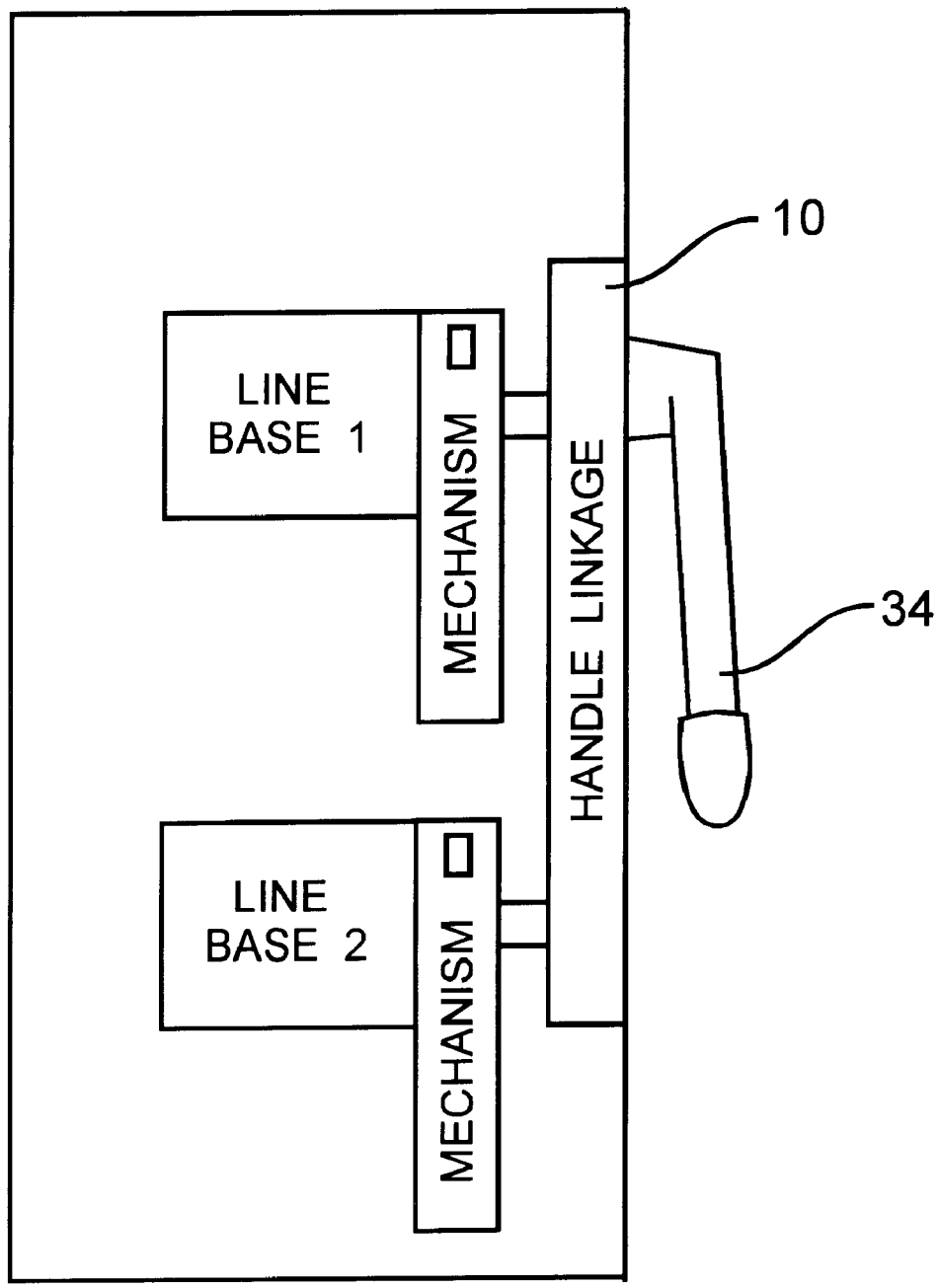
FIGS. 9A–D are possible switch configurations for use with the linkage assembly of the present invention.
Figure 9B:
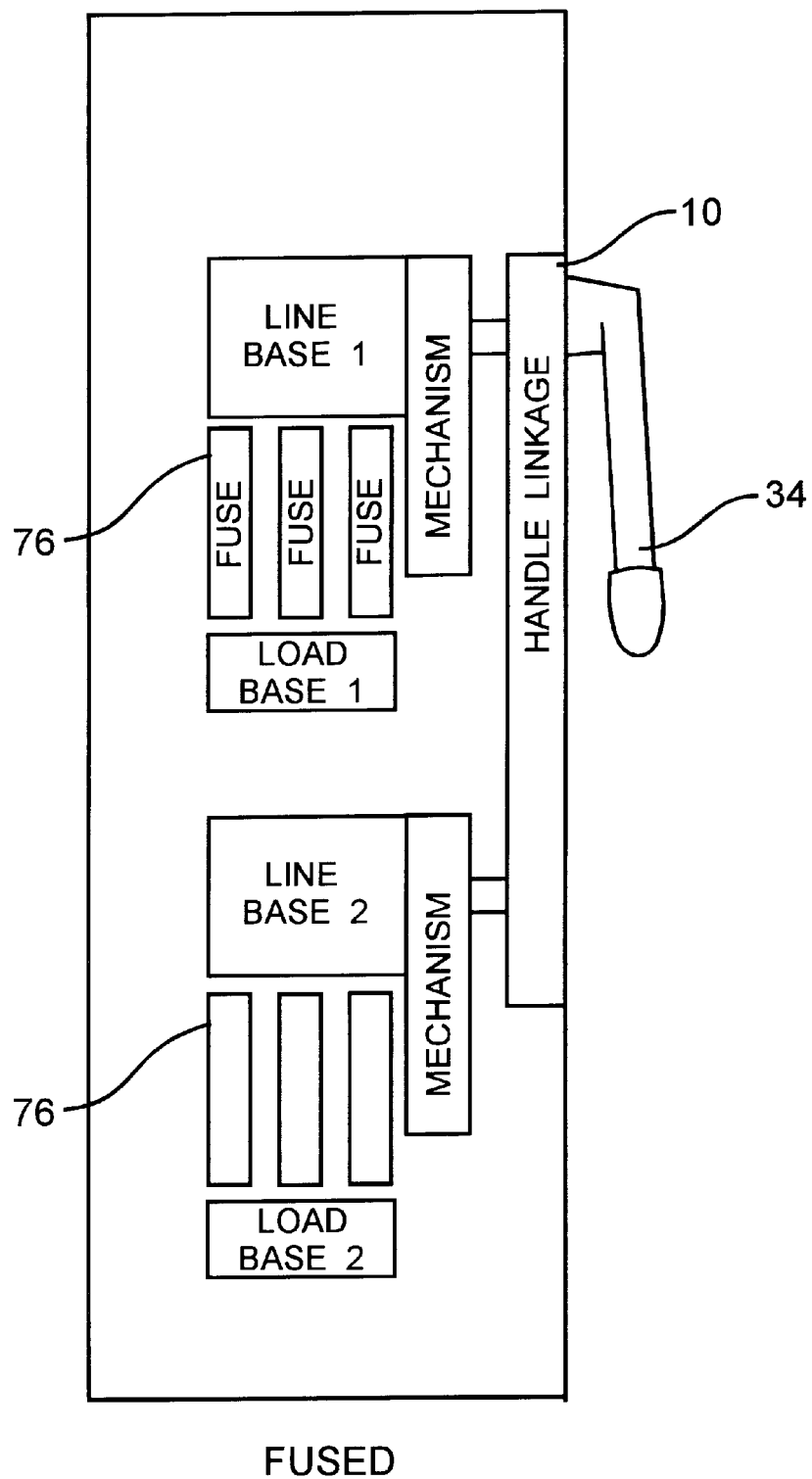
Figure 9C:
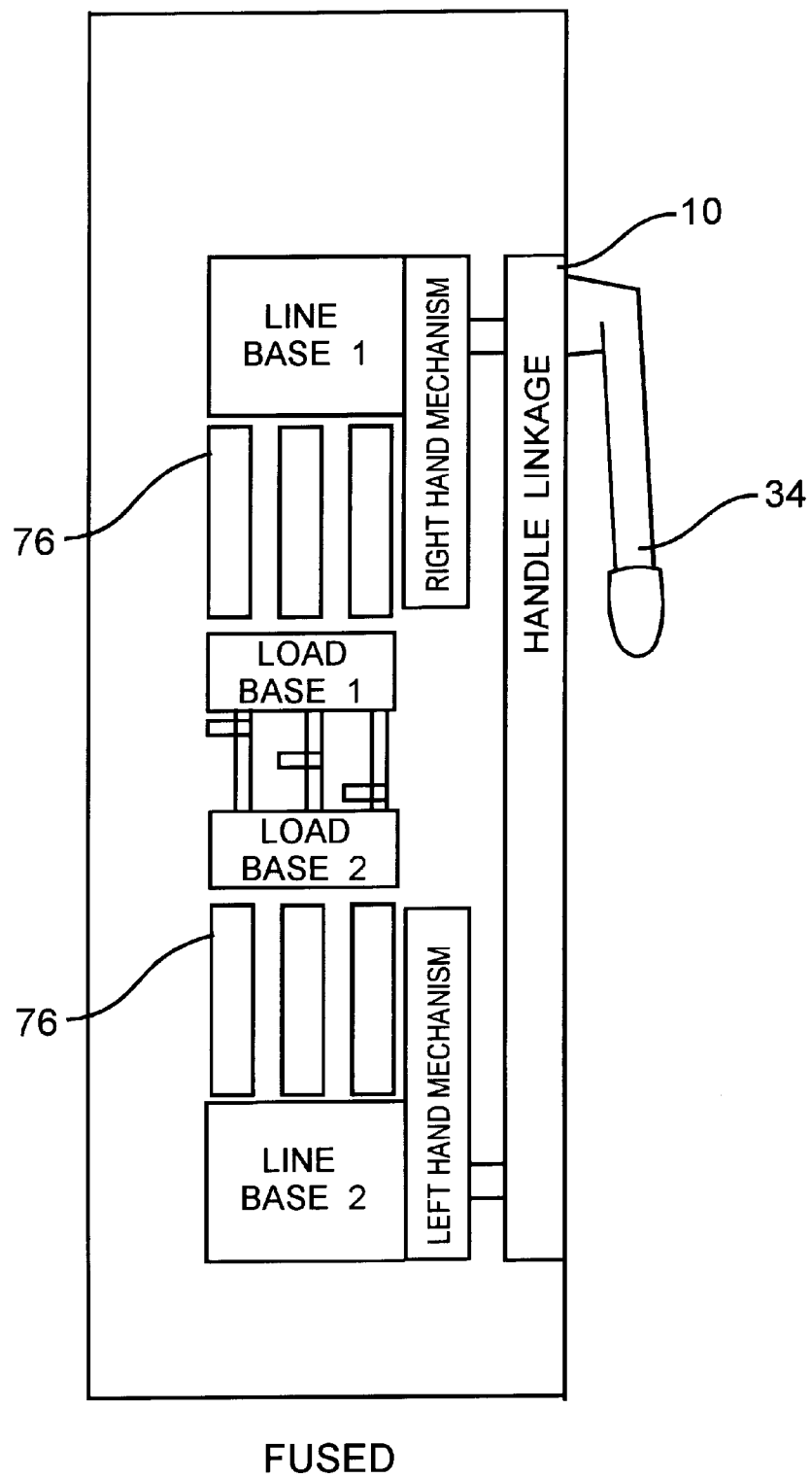
Figure 9D:
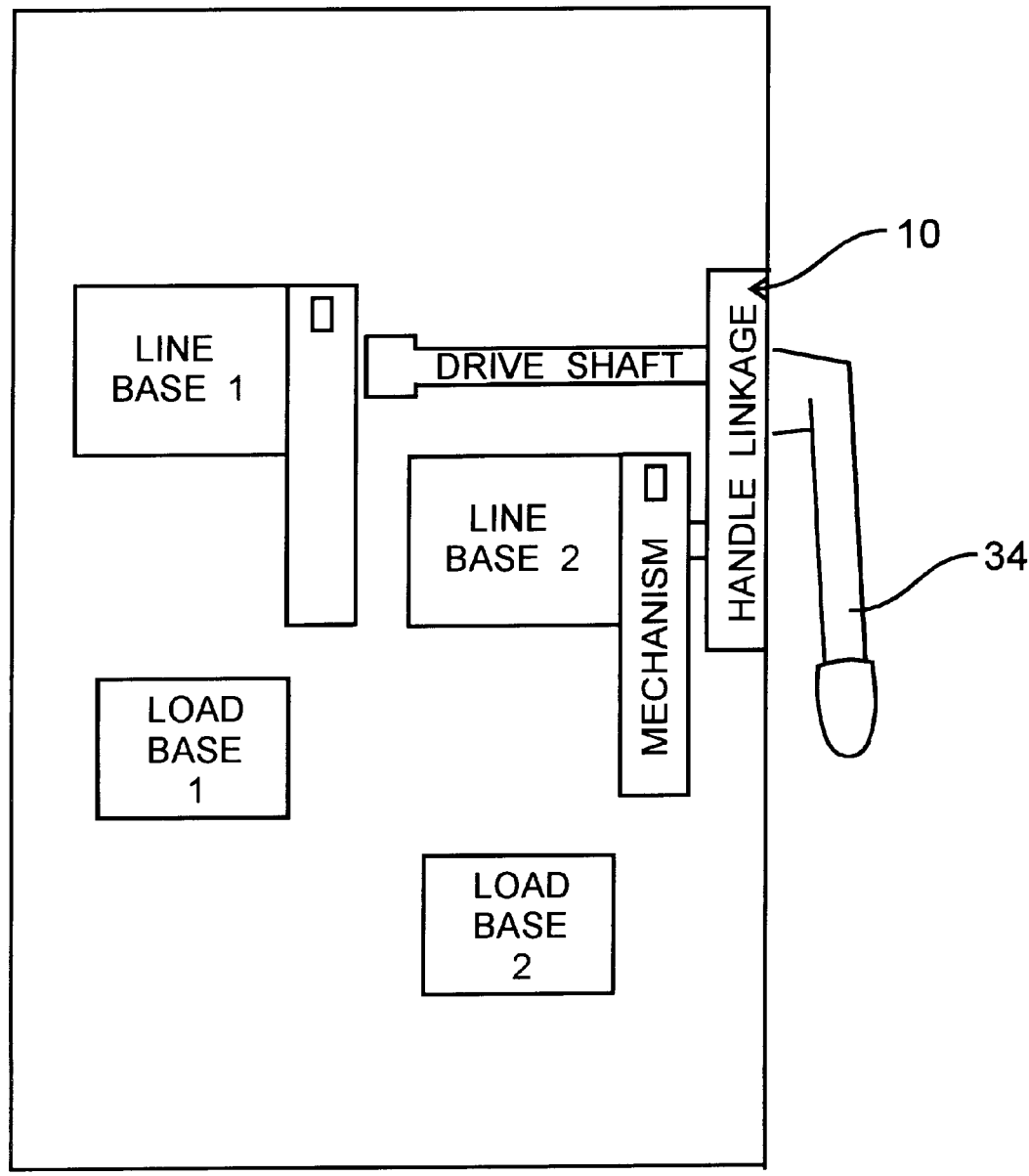

FIGS. 9A–D show typical configurations which can utilize the linkage assembly 10 of the double throw safety switch of the present invention. As shown in FIGS. 9B and 9C, the load and the line can be separated by fuses 76.

Figure 10:
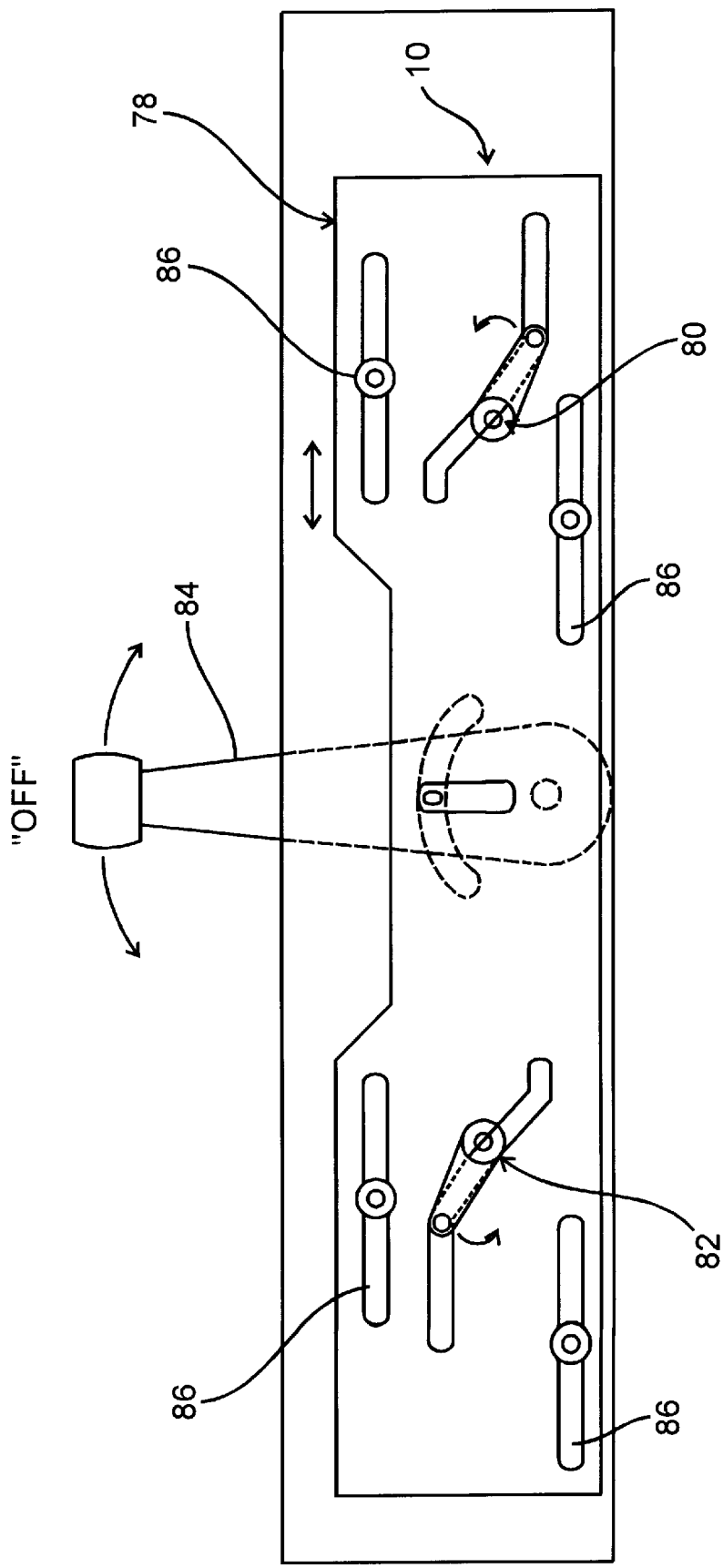
FIG. 10 is a further modified embodiment of a partial linkage assembly of the present invention with both switches in the "off" position.
Figure 11:
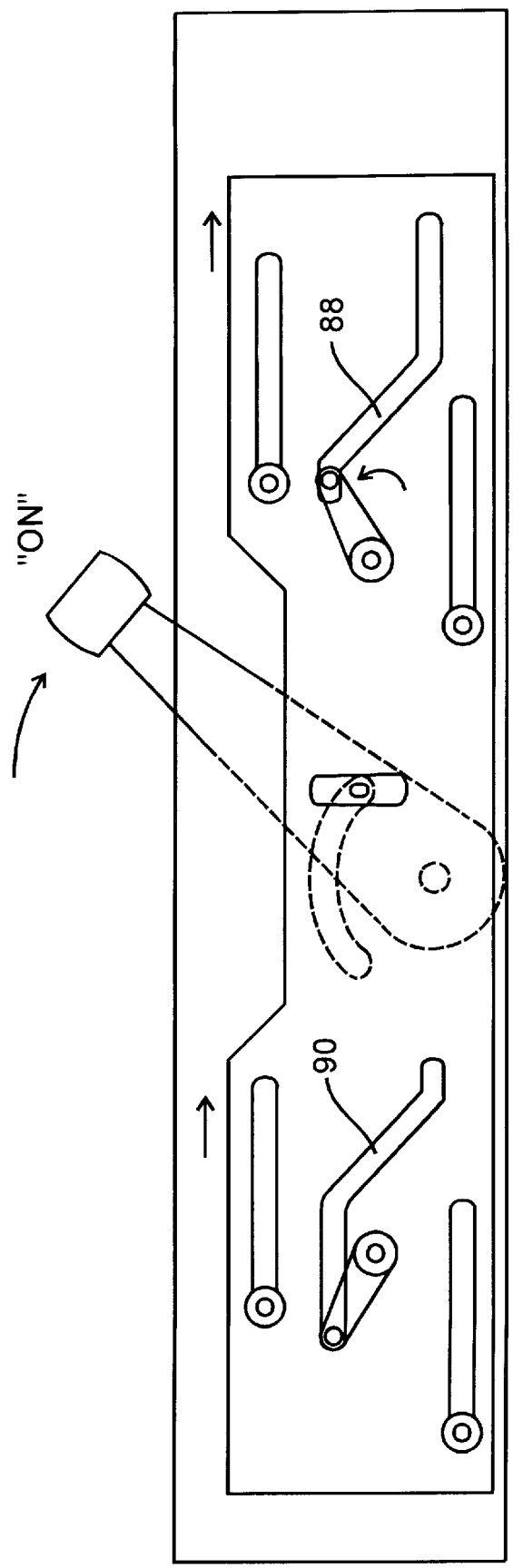
FIG. 11 is the partial linkage assembly of FIG. 10 with the right switch "on" and the left switch "off"
Figure 12:
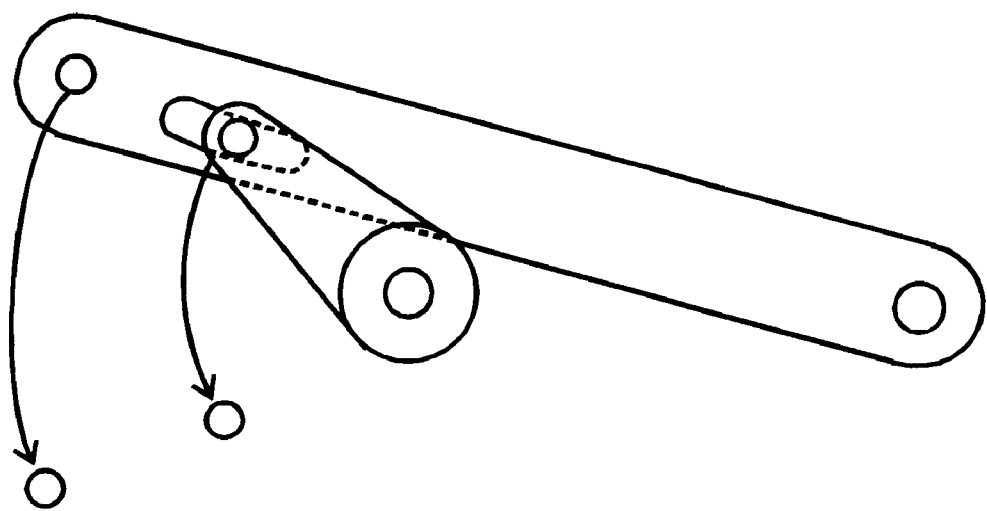
FIG. 12 is a further modified embodiment of an interface for more linear movement.

In an alternative embodiment, a linkage assembly 10' may utilize a single slider plate 78 to control both a first follower arm 80 and a second follower arm 82 to turn the first and second switches "on" and "off." A modified driver arm 84 is shown in FIG. 10 connected to a frame (not shown) and to the slider plate 78. The driver arm 84 is positioned to keep both the first switch and the second switch in an "off" position. Pivoting the driver arm 84 to the right moves the slider plate 78 to the right along guides, in the form of slots 86, in a similar manner as described above with respect to the first and second slider plates 14, 16. As shown in FIG. 11, a guide, again preferably a slot 88, is profiled to control movement of the first follower arm 78 to turn the first switch "on." Another guide 90 associated with the second follower arm 80, is profiled to keep the second switch in the "off" position as the slider plate moves to the right. Similarly, although not shown, pivoting the driver arm 84 to the left, moves the slider plate 78 to the left. The guides 88, 90 are profiled to keep the first switch in an "off" position, and to move the second follower arm 80 to turn the second switch to an "on" position. If a more linear travel is required for the handle and slider plate interface, the configuration of FIG. 12 can be utilized. The override mechanism described above can also be utilized with this linkage assembly 10'.

In both embodiments, the overall assembly is formed with top down design assembly techniques. Moreover, the slider plate or plates, along with the frame, sandwich all the linkage parts into the assembly such that the fasteners (e.g., screws) which connect the slider supports to the frame also retain all the remaining parts of the assembly.

I claim:

1. A linkage assembly for a double throw safety switch comprising:
   a frame
   a first slider plate moveably fastened to said frame and a second slider plate moveably fastened to said frame,
   a driver arm connected to said frame, said driver arm connected to said first slider plate and to said second slider plate
   a first follower arm connected to said frame, said first follower arm connected to said first slider plate, and
   a second follower arm connected to said frame, said second follower arm connected to said second slider plate.

2. The linkage assembly of claim 1 wherein said first slider plate comprises a first guide defined to allow for linear movement of said first slider plate.

3. The linkage assembly of claim 2 wherein said second slider plate comprises a first guide defined to allow for linear movement of said second slider plate.

4. The linkage assembly of claim 3 wherein said second slider plate comprises a second guide defined to rotatably move said second follower arm upon linear movement of said second slider plate away from a central portion of said driver arm.

5. The linkage assembly of claim 3 wherein said first guide in said second slider plate is a slot in said second slider plate.

6. The linkage assembly of claim 2 wherein said first slider plate comprises a second guide defined to rotatably move said first follower arm upon linear movement of said first slider plate away from a central portion of said driver arm.

7. The linkage assembly of claim 6 wherein said second guide on said first slider plate is a slot, said first follower arm further comprising a slider support positioned in said slot of said second guide.

8. The linkage assembly of claim 2 wherein said first guide in said first slider plate is a slot in said first slider plate.

9. The linkage assembly of claim 8 further comprising a slider support on said frame positioned in said first slot of said first slider plate.

10. The linkage assembly of claim 1 wherein movement of said first follower arm controls a first switch.

11. The linkage assembly of claim 10 wherein movement of said second follower arm controls a second switch.

12. The linkage assembly of claim 11 wherein rotation of said driver arm effects linear movement of said first slider plate and said second slider plate, and wherein said linear movement of said first slider plate effects rotational movement of said first follower arm and said linear movement of said second slider plate effects rotational movement of said second follower arm.

13. The linkage assembly of claim 12 wherein said driver arm, said first and second slider plates, and said first and second follower arms are configured such that said first switch is not "on" when said second switch is "on."

14. The linkage assembly of claim 11 further comprising a cover connected to said frame, said frame further comprising an engaging mechanism which engages said cover when one of said first switch and said second switch is "on" to prevent removal of said cover.

15. The linkage of claim 14 further comprising an override mechanism which disengages said engaging mechanism when one of said first switch and said second switch is "on" to allow removal of said cover.

16. The linkage assembly of claim 15 wherein said override mechanism comprises a defeat slider connected to said frame.

17. A double throw safety switch linkage assembly which prevents two switches from being "on" at the same time comprising
   a support frame having a driver arm connected to said frame by a shaft which allows for rotatable movement of said driver arm,
   a first slider plate moveably connected to said frame and moveably connected to said driver arm,
   a second slider plate moveably connected to said frame and moveably connected to said driver arm, a first follower arm rotatably connected to said frame, said first follower arm having a slider support positioned in a first slot in said first slider plate, said first follower arm controlling a first switch, a second follower arm rotatably connected to said frame, said second follower arm having a slider support positioned in a first slot in said second slider plate, said second follower arm controlling a second switch.

18. The linkage assembly of claim 17 further comprising a cover connected to said frame and said frame further comprising an engaging mechanism to prevent removal of said cover when one of said first switch and second switch is "on."

19. The linkage assembly of claim 18 further comprising an override mechanism which disengages said engaging mechanism when one of said first switch and said second switch is "on" to allow removal of said cover.

20. The linkage assembly of claim 19 wherein said override mechanism comprises a defeat slider connected to said frame and an override arm for engaging and moving said slidable arm.

* * * * *